C. J. REPPE.
MOUSETRAP.
APPLICATION FILED MAR. 26, 1920.

1,355,264.

Patented Oct. 12, 1920.

INVENTOR.
CARL J. REPPE,
BY HIS ATTORNEYS.

UNITED STATES PATENT OFFICE.

CARL J. REPPE, OF WINIFRED, MONTANA.

MOUSETRAP.

1,355,264.  Specification of Letters Patent. Patented Oct. 12, 1920.

Application filed March 26, 1920. Serial No. 368,857.

*To all whom it may concern:*

Be it known that I, CARL J. REPPE, a citizen of the United States, residing at Winifred, in the county of Fergus and State of Montana, have invented certain new and useful Improvements in Mousetraps; and I do hereby declare the following to be a full, clear, and exact description of the invention, such as will enable others skilled in the art to which it appertains to make and use the same.

My invention has for its object to provide an extremely simple and highly efficient trap especially adapted for catching mice, but adapted to be made in various sizes for the catching of mice, rats, or other rodents.

To the above ends, the invention consists of the novel devices and combinations of devices hereinafter described and defined in the claims.

The improved trap is illustrated in the accompanying drawings wherein like characters indicate like parts throughout the several views.

Referring to the drawings.

Figure 4:
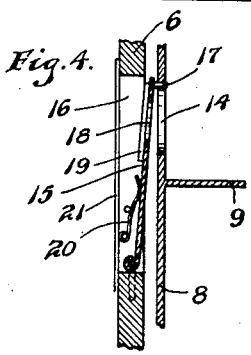
Fig. 4 is a detail in section on the line 4—4 of Fig. 1.
Figure 5:
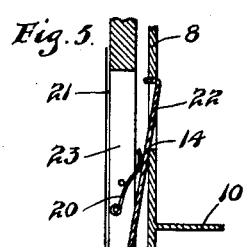
Fig. 5 is a detail in section on the line 5—5 of Fig. 1.

The numeral 6 indicates a rectangular box casing provided at one side with a vertically removable side plate 7 adapted to be slid to and from working position. Mounted within the casing 6 is a rotary cage made up of end plates 8, radial partitions 9 and supplemental partitions 10, all rigidly secured together and to an axial shaft 11, the ends of which latter are journaled in the front and rear plates of the casing 6. The rotary cage is thus formed with a plurality of compartments 12, as shown, four in number, and these compartments are open at the periphery of the cage. The front end head 8 has large openings 13 through which the mice may enter the compartment 12, and the rear end head plate 8. at the end of each compartment 12, is provided with a smaller perforation or opening 14. This cage is arranged to be always stopped normally in the position in which two of its radial partitions 9 will be horizontally disposed and the other two thereof vertically disposed; and this is accomplished by a trigger-acting stop dog 15 arranged to work in an opening 16 formed in the rear wall of the casing 6. As shown, the said stop dog 15 is pivoted at its lower end to the adjacent head of the casing 6, and at its upper end, has a projecting stop pin 17 adapted to enter into the alined perforation 14. To adapt this dog 15 to hold bait and to act as a trigger, I have shown the same as provided with an opening 18 and across said opening is a wire 19 to which the bait may be fastened. The dog 15 is yieldingly held in its operative position shown in Fig. 4, by gravity, or by a light spring 20. The opening 16 is preferably covered by a plate 21 that prevents the mouse from getting access to the bait from the outside of the casing of the trap.

Figure 1:
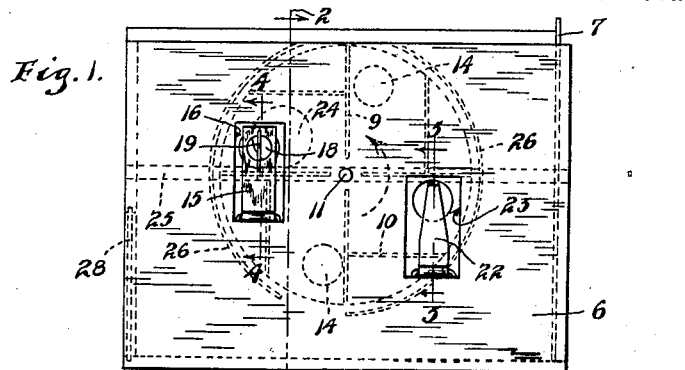
Figure 1 is a view in rear elevation showing the improved trap.
Figure 2:
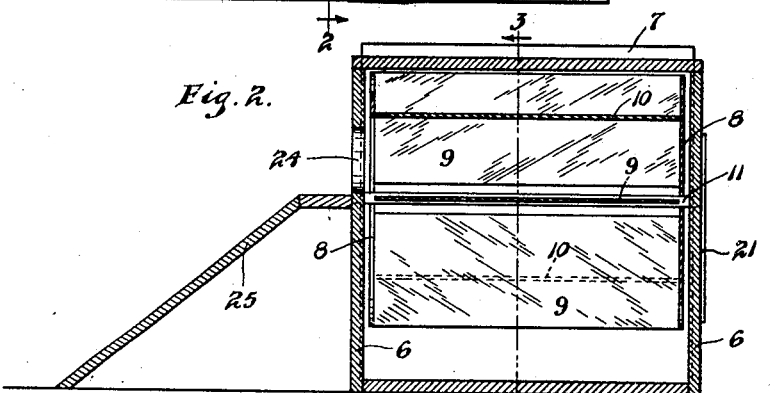
Fig. 2 is a vertical section taken on the line 2—2 of Fig. 1.
Figure 3:
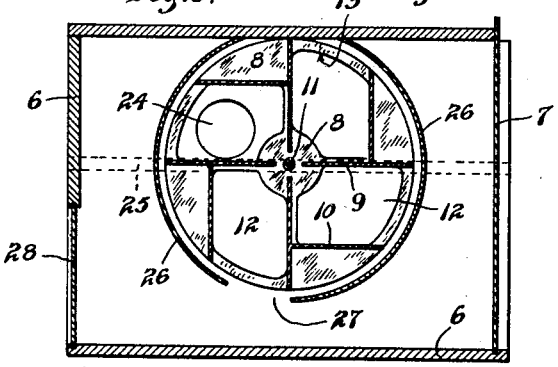
Fig. 3 is a transverse section taken on the line 3—3 of Fig. 2.

The numeral 22 indicates a retaining dog that prevents backward rotation of the cage and which, as shown, is pivoted at its lower end to the casing 6 and works in an opening 23 formed in the rear plate of said casing, the said opening being preferably covered also by the plate 21. Attention is here called to the fact that in Fig. 1, the plate 21 is removed. The free upper end of the retaining dog 22 stands in position to engage one of the perforations 14 of the cage, and to prevent backward rotation of the cage. The direction of rotation of the cage is indicated by the arrow marked on Fig. 1.

The front plate of the casing 6 is provided with a hole 24 that affords an entrance passage through which the mouse may enter the casing and one of the compartments 12 of the cage; and to make it easy for the mouse to reach this entrance passage, an inclined deck 25 is provided. As is evident, when the mouse enters through the opening 24 into the alined compartment 12 of the cage, it steps onto a platform afforded by the horizontally disposed partition 9 that is supported against downward movement by the stop dog 15, and thus is provided a stable support on which to run so that it will not give any warning of danger. After entering the said compartment, the mouse will find easy access to the bait on the retaining dog 15, but the first attempt to nibble the bait will force the dog outward and cause the pin 17 to be disengaged from the alined perforation 14, and when this takes place, the weight of the mouse will rotate the cage. The cage is nearly surrounded by a cylindrical shell 26 secured within the housing 6 but provided at its bottom with a discharge passage 27 located above the bottom of the casing. Hence, under the weight of the mouse, the cage will be rotated until the mouse is discharged into the bottom of the casing through the passage 27, and the dog 15 then immediately goes back into working position for engagement with the next perforation 14 and stops the cage in such position that its next compartment 12 will receive the next mouse. Thus it will be seen that the stop dog 15 acts both as a stop dog and as a trigger to trip the trap. Any mouse once delivered into the cage cannot possibly get out of the trap until the slide or side plate 7 is removed. The numeral 28 indicates a transparent plate shown as placed in one side of the casing 6.

In actual practice, the above trap has been found highly efficient for the purposes in view.

What I claim is:

1. A trap of the kind described, comprising a casing, a rotary cage mounted in said casing, a shell within said casing surrounding said cage and provided in its bottom with a discharge passage, said cage having a plurality of compartments open at one end and at the periphery of the cage, said casing having a mouse entrance passage with which the compartments of said cage are arranged to be alined in succession, a stop dog for normally holding the cage against rotation with one compartment thereof alined with the entrance passage of said casing, said stop dog having means for holding bait, and said cage having openings in its several compartments permitting access to the bait on said dog to trip the same out of action.

2. A trap of the kind described, comprising a casing, a cage rotatively mounted in said casing and provided with a plurality of compartments that are open at the periphery of the drum and at one end, and at the other end having perforations through which bait may be reached from the interior of the compartments, a yielding trigger-acting retaining dog having means for holding bait and having a projection normally engaging with the alined bait passage of the cage, and a shell within said casing surrounding said cage and having a discharge passage in its bottom.

In testimony whereof I affix my signature.

CARL J. REPPE.